US009336324B2

(12) United States Patent
Lomme et al.

(10) Patent No.: US 9,336,324 B2
(45) Date of Patent: May 10, 2016

(54) INTELLIGENT CACHING FOR SECURITY TRIMMING

(75) Inventors: Robert Lomme, Dracut, MA (US); Benjamin Wilde, Quincy, MA (US); Michael Tavis, Stow, MA (US); Alexei Evdokimov, Swampscott, MA (US); Siddharth R. Shah, Bothell, WA (US); Puneet Narula, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 850 days.

(21) Appl. No.: 13/286,219

(22) Filed: Nov. 1, 2011

(65) Prior Publication Data

US 2013/0111559 A1    May 2, 2013

(51) Int. Cl.
*G06F 15/16* (2006.01)
*G06F 17/30* (2006.01)
*G06F 21/62* (2013.01)

(52) U.S. Cl.
CPC ...... *G06F 17/30902* (2013.01); *G06F 21/6245* (2013.01)

(58) Field of Classification Search
CPC combination set(s) only.
See application file for complete search history.

(56) References Cited

U.S. PATENT DOCUMENTS

| | | | |
|---|---|---|---|
| 7,401,082 B2 | 7/2008 | Keene et al. | |
| 7,441,011 B2 | 10/2008 | Lin et al. | |
| 7,558,917 B2 | 7/2009 | Madan et al. | |
| 7,614,078 B1 * | 11/2009 | Stieglitz | 726/2 |
| 7,765,195 B2 | 7/2010 | Miller et al. | |
| 7,921,299 B1 | 4/2011 | Anantha et al. | |
| 2002/0095571 A1 * | 7/2002 | Bradee | 713/164 |
| 2003/0187917 A1 * | 10/2003 | Cohen | 709/203 |
| 2003/0217068 A1 * | 11/2003 | Fruchtman et al. | 707/101 |

(Continued)

FOREIGN PATENT DOCUMENTS

| | | | |
|---|---|---|---|
| CN | 1713578 A | 12/2005 | |
| CN | 101606146 A | 12/2009 | |

OTHER PUBLICATIONS

Harris, et al., "Best Practices: Common Coding Issues When Using the SharePoint Object Model", Retrieved at <<http://msdn.microsoft.com/en-us/library/bb687949%28v=office.12%29.aspx>>, Sep. 2007, pp. 11.

(Continued)

*Primary Examiner* — Taghi Arani
*Assistant Examiner* — Phy Anh Vu
(74) *Attorney, Agent, or Firm* — Julie Kane Akhter; Tom Wong; Micky Minhas (57) ABSTRACT

A security trimming system disclosed herein uses intelligent caching of the security trimming information received from a security datastore. The security trimming system uses an access cache to store the security trimming information received from the access datastore together with other parameters associated with such security trimming information. Subsequently, in responding to a request for the security trimming information, the security trimming system uses the cached value of the security trimming information together with the other associated parameters to determine a response to the request from the content providers. In one implementation, if the other parameters associated with a particular security trimming information imply that the security trimming information in the cache is still valid, the cached security trimming information is used in the request response. Otherwise, a new request is sent to the security datastore for an updated value of the security trimming information.

20 Claims, 6 Drawing Sheets

(56) References Cited

U.S. PATENT DOCUMENTS

| | | | |
|---|---|---|---|
| 2006/0021062 A1* | 1/2006 | Jang | 726/27 |
| 2006/0059252 A1 | 3/2006 | Tatsubori et al. | |
| 2006/0161680 A1* | 7/2006 | Balsevich | H04L 12/581 709/245 |
| 2008/0109427 A1* | 5/2008 | Miller et al. | 707/5 |
| 2008/0201478 A1* | 8/2008 | Yao | H04L 29/125 709/227 |
| 2009/0055924 A1 | 2/2009 | Trotter | |
| 2009/0132419 A1 | 5/2009 | Grammer et al. | |
| 2009/0244095 A1 | 10/2009 | Bowman et al. | |
| 2009/0271409 A1 | 10/2009 | Ghosh | |
| 2009/0313682 A1 | 12/2009 | Rajput et al. | |
| 2010/0125549 A1 | 5/2010 | Wang et al. | |
| 2011/0252459 A1 | 10/2011 | Walsh et al. | |
| 2013/0268310 A1* | 10/2013 | Wilson | G06Q 10/063116 705/7.16 |
| 2015/0055243 A1* | 2/2015 | Ehrlich | G06F 3/0625 360/69 |
| 2015/0220599 A1* | 8/2015 | Kline | G06F 17/30309 707/769 |
| 2015/0244972 A1* | 8/2015 | Pulido | H04N 5/91 386/295 |

OTHER PUBLICATIONS

Tisseghem, Patrick., "Customizing and Branding Web Content Management-Enabled SharePoint Sites (Part 2 of 3): Extending WCM", Retrieved at <<http://msdn.microsoft.com/en-us/library/aa830815%28v=office.12%29.aspx>>, Oct. 2006, pp. 19.

"My Sites overview (SharePoint Server 2010)", Retrieved at <<http://technet.microsoft.com/en-us/library/ff382643.aspx>>, Retrieved Date: Aug. 29, 2011, pp. 4.

"International Search Report", Mailed Date: May 29, 2013, Application No. PCT/US2012/062881, Filed Date: Oct. 31, 2012, pp. 9.

First Office Action and Search Report Received for Chinese Patent Application No. 201210427808.9, mailed Jan. 7, 2015, 14 Pages.

Second Office Action and Search Report Received for Chinese Patent Application No. 201210427808.9, mailed Sep. 25, 2015, 10 Pages.

"Supplementary Search Report Issued in European Patent Application No. 12845622.5", Mailed Date: Jun. 25, 2015, 6 Pages.

* cited by examiner

INTELLIGENT CACHING FOR SECURITY TRIMMING

BACKGROUND

The Internet and the web make it possible for content providers to share large amounts of information with their clients, partners, or other users. For example, healthcare providers share information with their clients about the services offered by the healthcare provider, generic information about various diseases, scheduling information for patient appointments, etc. Typically, such healthcare information is stored in a single datastore or a collection of datastores hosted on servers. Users can access such information using various applications, web browsers, etc. For example, a user can log on to a website provided by the healthcare provider to view such information. However, when a user is accessing a document or content that includes information with various levels of access privileges, it is necessary to determine that the user is provided only that content for which the user has access privilege. For example, when a patient is accessing the healthcare information from a healthcare provider, only the patient's appointment and the reasons for that appointment, or the references to the patient's appointment, should be shown to the patient. Given the large amount of information that is provided to end users, such as the patients of a healthcare information provider, and the large number of sources where such information and its privileges are stored, it is challenging to ensure that the users are disclosed only the privileged information.

SUMMARY

Implementations described and claimed herein address the foregoing problems by providing a security trimming system that uses intelligent caching of the security trimming information received from a security datastore. An access cache stores the security trimming information received from the access datastore together with the other parameters associated with such security trimming information, such as the time to live (TTL) for the security trimming information, the number of requests for the security trimming information, etc. Subsequently, in responding to a request for the security trimming information, the access cache uses the cached value of the security trimming information together with the other associated parameters to determine a response to the request from the content providers. For example, if the TTL associated with a security trimming information is valid, such security trimming information is used in the response to the request. Otherwise, a new request is sent to the security datastore for an updated value of the security trimming information.

In some implementations, articles of manufacture are provided as computer program products. One implementation of a computer program product provides a tangible computer program storage medium readable by a computing system and encoding a processor-executable program. Other implementations are also described and recited herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTIONS

The security trimming system disclosed herein allows content providers, such as the healthcare service providers, to ensure that only the users with the access privilege to the content are provided the content. The content providers often use security trimming providers that provide access to security trimming information that can be used to determine a user's access privilege to the content. In such a case, the security trimming providers determine a user's access privilege to the content prior to showing the content or a reference to the content to the user. In case of a healthcare provider displaying healthcare information to a patient, any healthcare information for which the patient does not have the access privileges is completely hidden from that patient or "trimmed out" of the documents/content displayed to the patient. To accomplish this, when the patient sends a request for the healthcare information to a webserver, the webserver calls the security trimming provider to determine the user's access privileges for the components of the requested content before providing any content to the patient. Subsequently, the webserver can trim out the privileged information for which the user does not have access.

However, sending a request to the security trimming provider every time an access privilege needs to be determined can become expensive due to the volume of such requests consuming a large amount of the communication bandwidth as well as the processor time. To avoid having to send a request the security trimming provider excessively, the security trimming system disclosed herein provides an intelligent caching of the security trimming information. Specifically, the security trimming system includes a cache for storing the security trimming information received from a security trimming provider, such that every request for the security trimming information does not have to be sent to the security trimming provider. Additionally, the security trimming system adds intelligence to the storing and processing of the security trimming information in the cache. For example, the security trimming system associates various other parameters, such as the time to live (TTL) for the content security information, to the security trimming information stored in the cache to generate a proxy or representation for the security trimming information.

Thus, if a healthcare provider is interested in determining whether a patient has access to any particular content, the webserver of the healthcare provider sends a request to the security trimming system to determine the patient's access privilege. The security trimming system first requests the cache for such security trimming information, or any proxy of such information. If no information is found in the cache, or if the information stored in the cache is stale information, the security trimming system sends a request to the security trimming provider. Furthermore, every time the security trimming system accesses and/or receives information from the security trimming provider, it also stores other information such as time of request, how many times a request is sent for particular security trimming information, etc., in the cache. Thus, if the webserver of the healthcare provider has already asked for a particular patient's access privilege for reviewing the scheduling information in the previous week and if the previous request generated a response that allowed that particular patient to access such scheduling information, the security trimming system uses such prior response saved in the cache to respond to the healthcare provider, without needing to send an expensive request to the security trimming provider.

By providing the intelligent cache system, the security trimming system disclosed herein reduces the number of requests sent to, and therefore the load on, the security trimming provider. Furthermore, by leveraging such intelligent cache, the security trimming system also reduces the time required to respond to requests from users such as the healthcare service provider. This, in turn, allows the users to be more responsive to the end users, such as the patients of the healthcare service provider.

Figure 1:
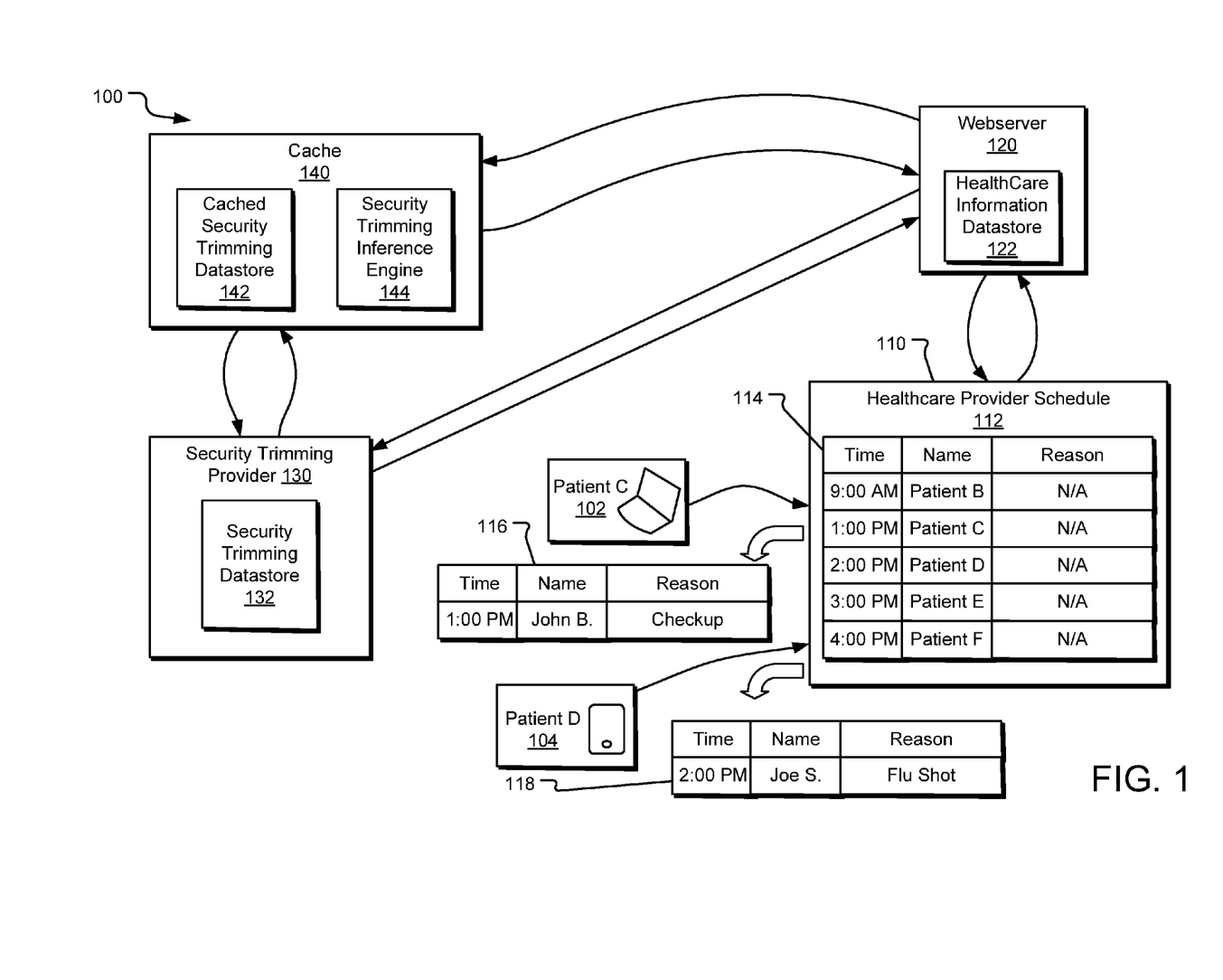
FIG. 1 illustrates the example data sources and flows for a security trimming system.

FIG. 1 illustrates the example data sources and flows for a security trimming system 100. Specifically, the security trimming system 100 is used to provide security privilege information about various users, such as a patient C 102, a patient D 104, of a healthcare provider. The patients 102, 104 access the information from the healthcare provider using a website 110 that provides a healthcare provider schedule 112 providing information about the schedule of a particular doctor, the schedule of a laboratory, etc. For example, each component of the schedule 112 is shown by a link that may be selected by a user to obtain additional information related to that component.

In one implementation, the healthcare provider hosts the website 110 on a webserver 120. When the patients 102, 104 access the website 110, various information identifying the patients 102, 104 is also sent to the webserver 120. For example, the browser of the computer used by patient C 102 sends information identifying the patient C 102 to the webserver 120. Alternatively, the webserver 120 requires the patient C 102 to authenticate on the schedule 112 using a login and password, or other authenticating means.

Once the webserver 120 authenticates the patient C 102, the webserver 120 determines what information can be provided to the patient C 102. For example, when the patient C 102 accesses the healthcare provider schedule 112, the webserver 120 determines whether the patient C 102 should be provided access to the schedule 112 at all. In determining so, the webserver 120 verifies the identity of the patient C 102. For example, a healthcare information datastore 122 stores information about the identities of various patients and their access privileges to healthcare information, including the schedule 112. Additionally, the webserver 120 also determines what part of the schedule 112 should be shown to the patient C 102. For example, the schedule 112 lists all the appointments of a doctor for a given day, including the patients' names and the reasons for the appointments. However, due to various privacy and legal reasons, it is necessary that the names and the appointment reasons for one patient is not shown to another patient. Thus, when the patient C 102, having an appointment at 1:00 PM, accesses the schedule 112 only the name John B., and the reason for the appointment "checkup," are shown on the schedule 112.

The webserver 120 makes such determination about the information it shows to the patient C 102 after determining the access rights of the patient C 102 to various component content of the schedule 112. The webserver 120 uses a security trimming process to determine the information that is displayed to the patient C 102. Security trimming is a process by which a user's access to a piece of content is determined prior to showing the user any reference to such information. For example, any links in the schedule 112 are shown to a patient only if that patient has access to the underlying content. In one implementation, such security trimming information related to the content of the schedule 112 is provided by a security datastore, such as a security trimming provider 130. The webserver 120 displays a link on the schedule 112 only if the security trimming provider 130 verifies a patient's access rights to the underlying content.

For example, when the patient C 102 accesses the schedule 112, a request from the webserver 120 to the security trimming provider 130 identifies that the patient C 102 has access privileges for only the patient name and the appointment reason for the 1:00 PM time-slot. In this case, the patient C 102 is presented with a modified version of the schedule 116. On the other hand, if the patient D 104 accesses the schedule 112, a modified schedule 118 is presented to the patient D 104 for the 2:00 PM time-slot. On the other hand, if a healthcare provider, such as an administrator of the hospital, a doctor, etc., accesses the schedule 112, the healthcare provider is given information about the entire schedule 112, including patient names and appointment reasons for all time-slots on the schedule 112.

In an implementation of the security trimming system 100, each time the webserver 120 sends a request to the security trimming provider 130, the results generated by the security trimming provider 130 are stored in a cache 140. Furthermore, instead of sending a request for security trimming to the security trimming provider 130, in an alternative implementation, the webserver 120 sends request for the security trimming information to the cache 140. Thus, for example, when the patient C 102 sends a request to access the schedule 112, the webserver 120 first sends a request to the cache 140 to determine the patient's access privileges for various components of the schedule 112.

The cache 140 determines if it has the required security trimming information to provide a response to the webserver 120. For example, the cache 140 requests a cached security trimming datastore 142 to determine the response sent to the webserver. The security trimming datastore 142 is configured to store security trimming information based on past requests to the security trimming provider 130. For example, if in response to the prior request for the access privileges of the patient C 102 to a component of the healthcare provider schedule 112, the security trimming provider 130 returned the value of "access," the cached security trimming datastore 142 stores "access" as the value of the access privilege for the patient C 102 to that component of the healthcare provider schedule 112. Other potential values returned from the security trimming provider 130 include "no access," "indeterminate," "failure," etc. Yet alternatively, the access privilege values are returned for providing varying levels of access to the content. Thus, a doctor is provided an "edit access," to particular content on the healthcare provider schedule 112, whereas a patient is provided a "view access" to that particular content.

In one implementation, where a content provider, such as the webserver 120, requests the location of the content and a user's access privilege to that content, a definitive "access" or "no access" results is provided to the content provider. In an alternative implementation, where the security trimming provider 130 is a search result provider, the security trimming provider 130 returns the value of "access" if the user has access to a piece of content. However, in such a case the security trimming provider 130 returns "indeterminate" value if the user has no access, if the security trimming provider 130 is not aware of the content, or if the content has been moved or deleted. Similarly, it is also likely that the request to the security trimming provider 130 fails, in which case a "failure" value is returned. Examples of events causing the failure of the request to the security trimming provider 130 include a query failure, a failure due to temporary networking issues, an overload of requests received by the security trimming provider 130, etc.

In one implementation, if the security trimming provider 130 returns "access" or "no access" as the value of the security trimming information, the cache 140 writes such value to the cached security trimming datastore 142. Such value of the security trimming information is used to respond to subsequent requests from the webserver 120. However, if the security trimming provider 130 does not return a definitive "access" or "no access" value, the cache 140 undertakes additional interpretation of the received value to determine whether a user has access to a piece of content or not.

The cache 140 also includes a security trimming inference engine 144 that uses the value of the security trimming information stored in the cached security trimming datastore 142 and various other associated parameters associated with the security trimming information to determine a response to a request from the webserver 120. Specifically, the security trimming inference engine 144 determines whether a user has access to a piece of content or not when the security trimming provider 130 does not return a definitive "access" or "no access" value.

For example, if the security trimming provider 130 returns the value of the security trimming information about a piece of content as "indeterminate" or "failure," the cache 140 stores additional information, such as the timing of the next request to be sent to the security trimming provider 130 for the value of the security trimming information about that piece of content, the number of times the cache 140 has sent such request to the security trimming provider 130, etc. In one implementation, a time to next request counter and a number of requests counter are used to store the timing information. Storing such information allows the cache 140 to ensure that not too many requests are sent to the security trimming provider 130 for the same security trimming information in a short period of time. Such information also allows the cache 140 to make an inference about the value of the security trimming information. For example, if each of the last three requests to the security trimming provider 130 returned the value of "indeterminate" for a user's access privilege to a piece of content, the cache 140 determines that the user does not have access to that piece of content, thus setting the value of the security trimming information for that piece of content to "no access" for a period of time. In such a case, after the period of time has expired, the cache 140 sends a new request to the security trimming provider 130 in response to a new request from the webserver 120 for information about that piece of content.

In one alternative implementation, the security trimming inference engine 144 uses various parameters associated with the security trimming information stored in the cached security trimming datastore 142 to generate the representative values of such security trimming information that is sent to the webserver 120. The security trimming inference engine 144 also sets values of such parameters based on the values of other such parameters. For example, the security trimming inference engine 144 stores the information about the last time a particular security trimming information was received from the security trimming provider 130, the number of times the security trimming provider 130 sent an affirmative value in a predetermined prior period, etc. Subsequently, the security trimming inference engine 144 uses such information to set a TTL associated with a security trimming information.

As an example, if the cache 140 has sent three requests in the last week for the security trimming information associated with the particular content of the schedule 112 and each time the security trimming provider 130 generated an affirmative value, the security trimming inference engine 144 sets the TTL associated with that particular security trimming information to a "Long" time value. Subsequently, when a request is received from the webserver 120 for the security trimming information, the security trimming inference engine 144 evaluates a TTL attached to the security trimming information in the cached security trimming datastore 142 to determine the response to be sent to the webserver 120. For example, if the TTL for the security trimming information is greater than a predetermined threshold, the security trimming inference engine 144 determines the representative value of that security trimming information to be the same as that stored in the cached security trimming datastore 142. However, if the TTL for the security trimming information is less than the predetermined threshold, the security trimming inference engine 144 instructs the cache 140 to send a new request to the security trimming provider 130 for the current value of the security trimming information.

The cache 140 returns either the actual value of the security trimming information received from the security trimming provider 130 or the representative value of such security trimming information to the webserver 120. In one implementation, the cache 140 also communicates to the webserver 120, whether the value is the actual or the representative value of the requested security trimming information. In an alternative implementation, the security trimming inference engine 144 also generates a confidence value that specifies the likelihood of the representative value of the security trimming information to be the same as the actual value of the security trimming information. In such an implementation, the confidence value is also communicated to the webserver 120 together with the representative value of the security trimming information. Subsequently, the webserver 120 determines whether to use the representative value of the security trimming information.

If the cache 140 determines that it cannot respond to the security trimming request from the webserver 120 because the cached security trimming datastore 142 does not have a valid value of the requested security trimming information and because the security trimming inference engine 144 cannot generate a valid representative value for the requested security trimming information, the cache 140 sends a request to the security trimming provider 130 to get the updated security trimming information. In an alternative implementation, the cache 140 analyzes the other parameters associated with the security trimming information in the cached security trimming datastore 142 to determine when to send a request to the security trimming provider 130 for an update.

Alternatively, the cache 140 is configured to send periodic requests to the security trimming provider 130 for various security trimming information. For example, the cache 140 sends such requests on a daily basis at a time of the day when the communication networks connecting the cache 140 and the security trimming provider 130 are less congested, when the security trimming provider 130 is not very busy servicing a large number of security trimming requests, etc. Once the webserver 120 receives the security trimming information or a representative value of the security trimming information from the cache 140, the webserver 120 uses such security trimming information to determine which part of the schedule 112 is shown to a user.

In one implementation, the various components of the security trimming system 100 are communicatively connected to each other by a communications network, such as the Internet, a virtual private network (VPN), a mobile communications network, etc. In an alternative implementation, the cache 140 is located on a server that is easily accessible to the webserver 120, such as on a cloud server that provides virtual memory to the webserver 120. Alternatively, the content on the cache 140 is mirrored automatically on the virtual memories of a number of webservers such that each of such webservers can send requests to the cache 140 without having to communicate through a public communication network.

Figure 2:
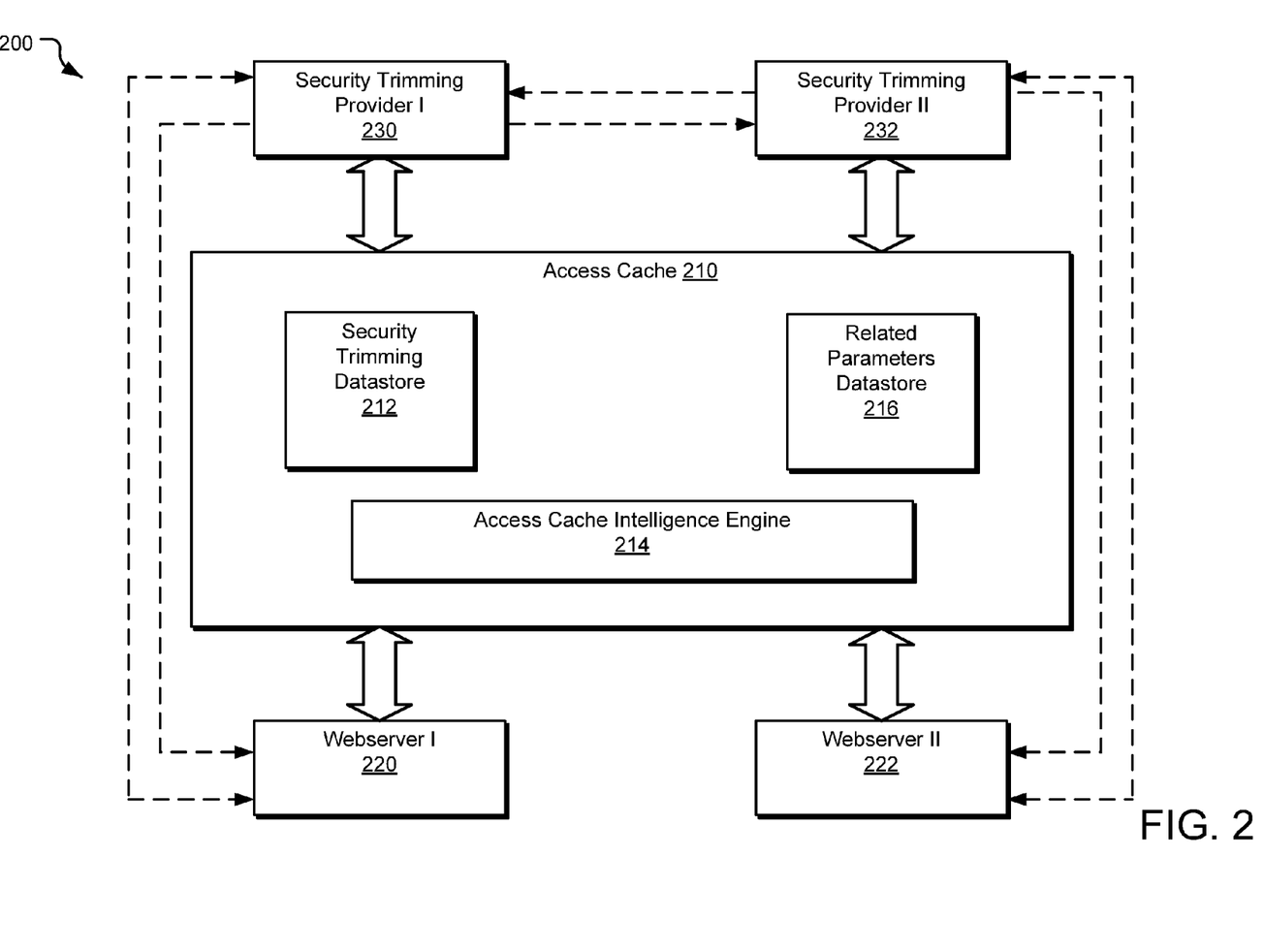
FIG. 2 illustrates the alternative example data sources and flows for a security trimming system.

FIG. 2 illustrates the example data sources and flows for a security trimming system 200. The security trimming system 200 includes an access cache 210 that provides intelligent caching for multiple security trimming providers. In one implementation, the webservers 220, 222 use the access cache 210 to get access to the security trimming information provided by the security trimming providers 230, 232. For example, the webserver I 220 is a webserver for a healthcare service provider that requires security trimming information for content disclosed on a website. In one implementation, the content on the webserver I 220 requires security trimming information from both of the security trimming providers 230, 232. Similarly, the webserver II 222 also requires security trimming information from both of the security trimming providers 230, 232. In one implementation of the security trimming system 200, the security trimming provider I 230 is designated to be the primary security trimming provider and the security trimming provider II 232 is designated to be the secondary security trimming provider. In such an implementation, a request is sent to the secondary security trimming provider when a request to the primary security trimming provider gives an "Indeterminate" response. In an alternate implementation, a request is sent to the secondary security trimming provider based on an observation about the trimming request load on the primary security trimming provider.

While the webservers 220, 222 can access the security trimming providers 230, 232 directly (as shown by the dotted lines) to get the necessary security trimming information, the security trimming system 200 illustrates the webservers 220, 222 using the access cache 210 to get the necessary security trimming information. For example, when the webserver I 220 needs to determine the security trimming information for the content displayed on a healthcare schedule, the webserver I 220 uses the access cache 210 to obtain such security trimming information.

The access cache 210 includes a security trimming datastore 212 that stores security trimming information received from the security trimming providers 230, 232. Such security trimming information can be collected as a result of the prior security trimming requests sent to the security trimming providers 230, 232. Upon receiving the request from the webserver I 220, an access cache intelligence engine 214 determines whether the security trimming datastore 212 includes the necessary information to respond to the request from the webserver I 220. If so, the access cache 210 checks various parameters associated with the security trimming information in the datastore 212 to determine the usefulness of such security trimming information.

One example of such an associated parameter is the TTL attached to the security trimming information that provides information about the staleness of the security trimming information stored in the security trimming datastore 212. If such TTL has expired, that is, the security trimming information is considerably old, the access cache intelligence engine 214 determines that such security trimming information cannot be used. In such a case, the access cache 210 sends a new request, or schedules a new request, to the security trimming providers 230, 232 as necessary.

Figure 3:
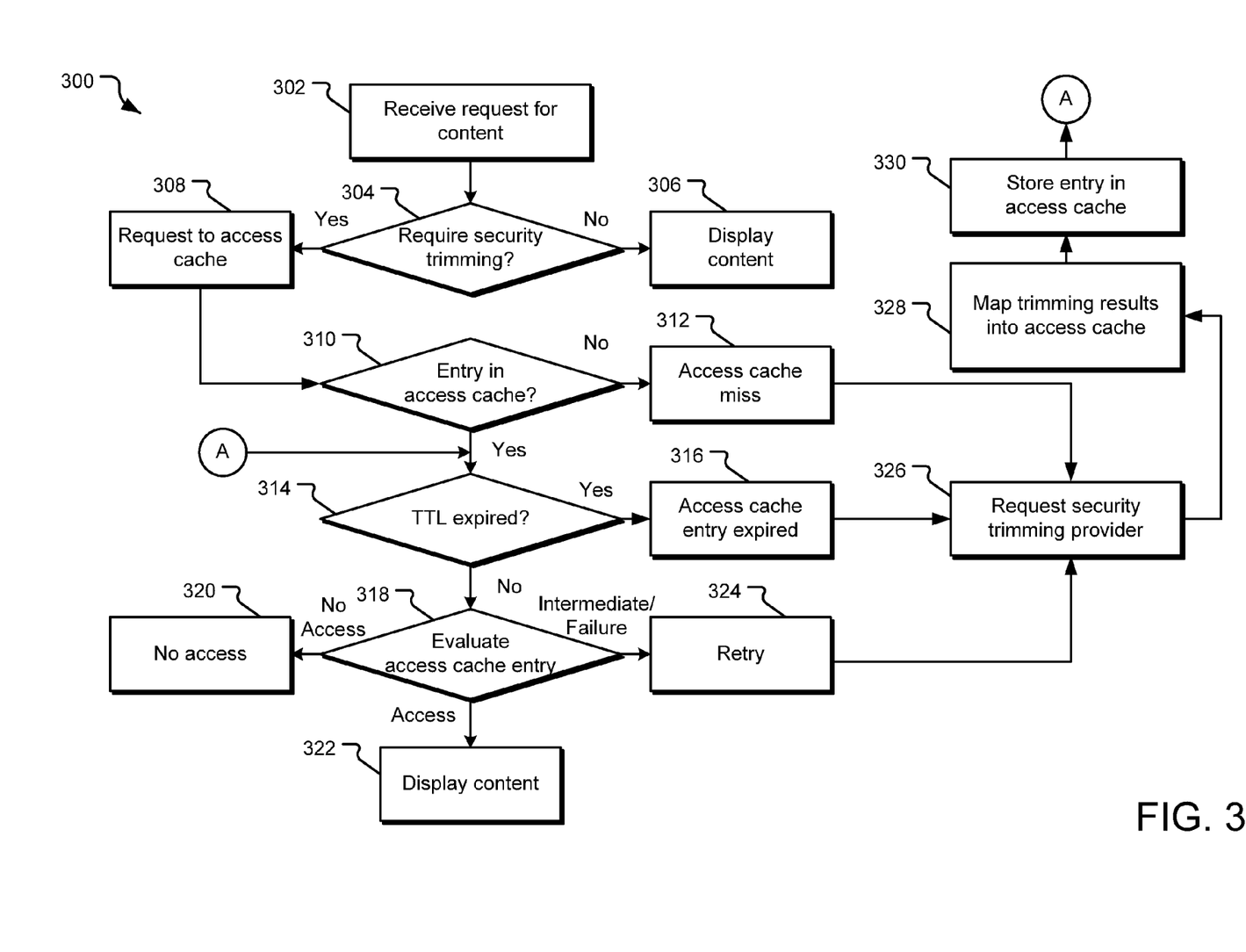
FIG. 3 illustrates example operations for the security trimming system disclosed herein.

FIG. 3 illustrates example operations 300 for the security trimming system disclosed herein. For example, the operations 300 are used in a healthcare information system that provides healthcare scheduling information to patients. A receiving operation 302 receives a request for content at a website or other resource provided by a server. For example, the receiving operation 302 receives a request from a patient of a healthcare information provider for the patient's appointment with a particular doctor. When the patient visits a healthcare information schedule using a web browser, the server hosting such healthcare information schedule first determines which parts of the healthcare information schedule and which other content on the schedule page can be shown to the patient.

A request evaluation operation 304 determines if displaying the content requested by the patient requires any kind of security trimming information. If the doctor's schedule has twenty appointments for the day, each of the various patients visiting the schedule is able to view only portions of the doctor's schedule. Similarly, if the doctor has a part of the day blocked off for research, the doctor can ensure that the patients are not able to see such research time on the doctor's schedule. In the case of the request from the patient to see the schedule, the request evaluation operation 304 determines whether the patient should be provided access to a particular content on the schedule. In an implementation, if there are a number of patient appointments for the given doctor, the request evaluation operation 304 determines security trimming requirements for the content in each of the various time slots to determine which of these content should be displayed to the patient.

If the request evaluation operation 304 determines that a particular content requested by the patient does not require any security trimming information, a displaying operation 306 displays such content to the patient. For example, if the appointment schedule includes some generic content about the doctor's specialty, the map of the doctor's office, etc., which does not require any security trimming information, the displaying operation 306 displays such generic content to the patient. On the other hand, if the request evaluation operation 304 determines that the requested content requires security trimming information, a requesting operation 308 sends a request for the security trimming information for the content.

In one implementation, the requesting operation 308 sends the request for the security trimming information to an access cache that is configured to store security trimming information for multiple security trimming providers. However, in an alternative implementation, the requesting operation 308 sends such request directly to the security trimming providers. Yet alternatively, the requesting operation 308 sends such request to both the cache and the security trimming provider. For example, when time is of essence in responding to a request from a user, the requesting operation 308 sends such request to both the cache and the security trimming provider to ensure a quick response.

Subsequently, a determining operation 310 determines if there is an entry in the access cache for the requested security trimming information. If there is no security trimming information found in the access cache, a declaration operation 312 declares an access cache miss. In an alternative implementation, the declaration operation 312 also assigns other parameters to that particular security trimming information, such as the time of the request for the security trimming information, etc. Alternatively, the declaration operation 312 also adjusts a number of requests counter that keeps track of how many times a request for that particular security trimming information has been received in a given time period. Such counter information is used by the access cache to determine if a request for that particular security trimming information is to be included in an automatic security trimming information request sent from the access cache to the security trimming providers.

However, if the determining operation 310 determines that there is an entry in the access cache for the requested security trimming information, another determining operation 314 evaluates various parameters, such as the TTL associated with the security trimming information in the access cache. Specifically, the determining operation 314 evaluates the value of such TTL to determine the validity of the stored value of the security trimming information in the cache. For example, if a particular security trimming information found in the cache was received from a security trimming provider a long time ago, the TTL attached to that particular security trimming information will have expired when evaluated by the determining operation 314. In such a case a declaration operation 316 declares that particular security trimming information entry in the access cache as being expired or invalid.

On the other hand, if the TTL for the security trimming operation has not expired, an evaluation operation 318 evaluates the access cache entry for the security trimming information. For example, if the patient trying to access a particular content on the healthcare schedule does not have access to that content, the security trimming entry in the access cache will have a value of "No Access." In such a case, control is passed to an operation 320, which notifies the server requesting the security trimming information that the patient does not have access to the content. As a result, the server does not display such content to the patient. However, if the patient trying to access the particular content on the schedule has access to that content, the security trimming entry in the access cache will have a value of "Access." In such a case, control is passed to an operation 322, which notifies the server requesting the security trimming information that the patient has access to the content. As a result, the server displays such content to the patient.

In some situations, it is possible that the value of the security trimming information in the access cache being "Indeterminate" or "Failure." For example, if each prior request from the access cache to a security trimming provider for a security trimming information resulted in an "Indeterminate" response, that is, the security trimming provider did not know whether the patient has access to the content, the access cache assigns the security trimming information a value of "Indeterminate." Similarly, if each time the access cache tried to get security trimming information there was no response from the security trimming provider, which may happen due to heavy demand on the security trimming provider, failure of communication network, etc., the access cache assigns the security trimming information a value of "Failure." In such cases of the security trimming information having a value of "Indeterminate" or "Failure," an operation 324 marks the security trimming information for a retry.

If the operations 300 results in a miss for a particular security trimming information in the access cache, an expired TTL for the particular security trimming information, or the value of the particular security trimming information being a "Failure" or an "Indeterminate," a requesting operation 326 requests a security trimming provider for the updated or current value of that particular security trimming information. In one implementation, such request is sent in real-time as soon as the value of the security trimming information is found to be missing, expired, Failure, or Indeterminate. However, in an alternative implementation, the access cache adds such security trimming information request to a batch of other pending requests to the security trimming providers. In such an implementation, such batch of requests is sent to the security trimming providers at predetermined time intervals. However, in an alternate implementation, the batching of the requests sent to the security trimming providers is based on the various requests received by the access cache. For example, if a patient wanted to see the schedule, the test results, and the diagnosis, all at once on a web page of the healthcare provider, the cache batches together the requests for the security trimming information for each of the schedule, the test results, and the diagnosis into one batch and sends such batch of requests to the security trimming provider. This allows the security trimming system 300 to save valuable network bandwidth.

A mapping operation 328 maps the results of the request to the security trimming providers in the access cache. In one implementation, if the value of a security trimming information before the request was sent to the security trimming provider was "Access" and the result of the request shows the value of the security trimming information to be "Access" as well, the TTL associated with such security trimming information is assigned a value of "Long." In such a case, the access cache determines that given the re-affirmation of the security trimming information value being "Access," the access cache can use this value with high level of confidence for a longer time period. Similarly, if the current value of the security trimming information in the access cache is "Failure," and a result of the request shows the value of the security trimming information to be "Failure" as well, the access cache sets the value of the TTL to be "Short." In such a case, the cache sends a request to the security trimming provider in a short time period, or more aggressively, to get a more definitive answer about the value of the security trimming information.

On the other hand, if the value of a security trimming information before the request was sent to the security trimming provider was "Indeterminate" with a large number of requests having already been sent to the security trimming provider, and if the result of the request shows the value of the security trimming to be "No Access," the TTL associated with such security trimming information is assigned a value of "Long." In such a case, given that all the previous attempts to determine the value of the security trimming information resulted in "Indeterminate" and the request resulted in the value being "No Access," for a long future time period, the access cache will use the value of "No Access" for the security trimming information. Setting the value to "No Access" for a long period of time results in less frequent requests being sent to the security trimming provider and therefor, reduction in expensive traffic to the security trimming provider for a piece of content to which the user most likely does not have access.

Similarly, if the current value of a security trimming information before the request was sent to the security trimming provider was "Indeterminate" with a relatively small number of requests having already been sent to the security trimming provider, and if the result of the request shows the value of the security trimming to be "No Access," the TTL associated with such security trimming information is assigned a value of "Short." In this case, the access cache also increases the value of the number of attempts for the security trimming information sent to the security trimming provider. After mapping the results of the request to the security trimming providers in the access cache, a storage operation 330 stores the received value of the security trimming information in the access cache.

Figure 4:
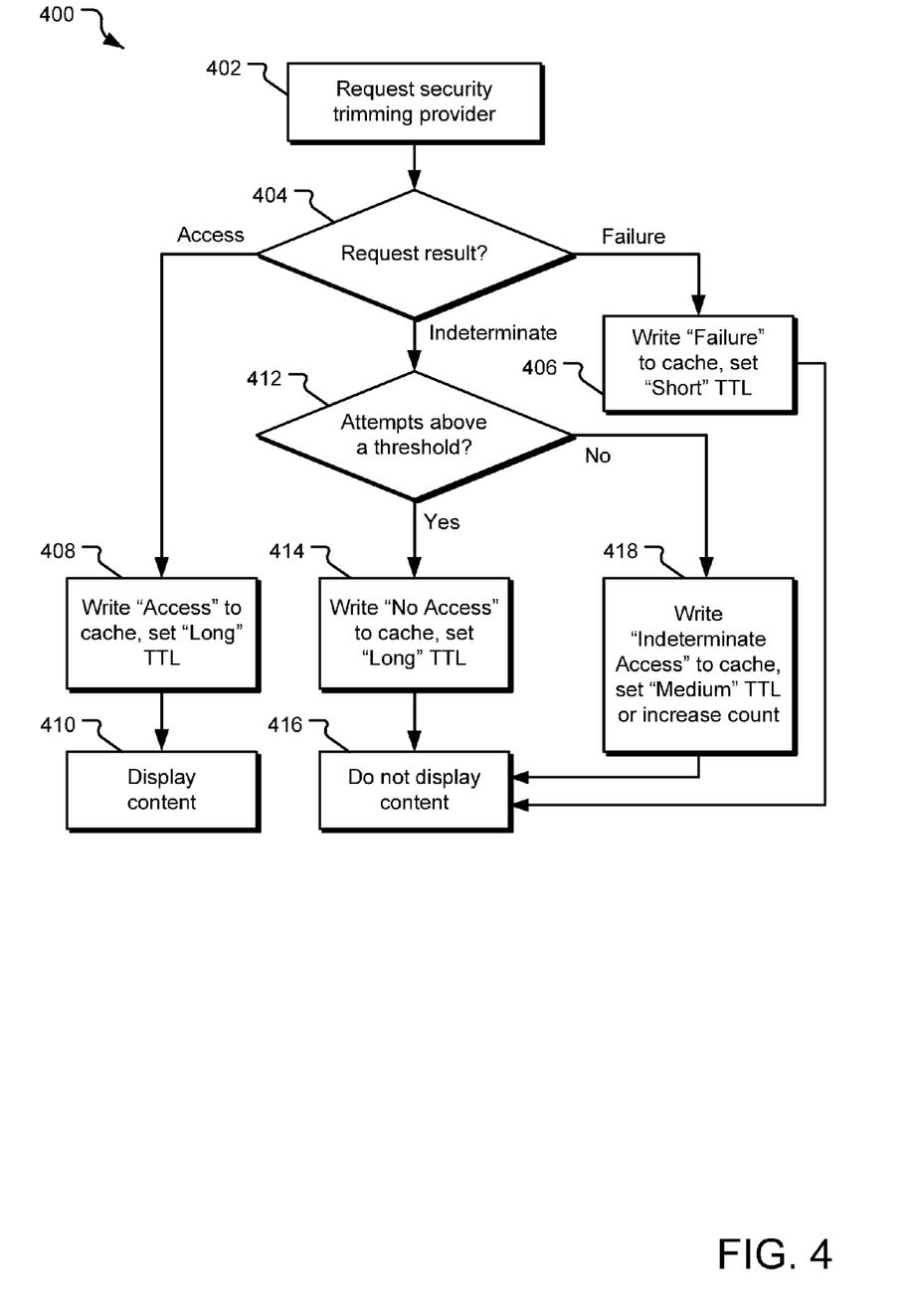
FIG. 4 illustrates the alternative example operations for the security trimming system disclosed herein.

FIG. 4 illustrates alternative example operations 400 for the security trimming system disclosed herein. Specifically, the operations 400 illustrate an access cache requesting a security trimming provider when a particular security trimming information has a value of "Indeterminate." For example, if a patient is trying to access a doctor's appointment schedule for the first time, the access cache storing the security trimming information does not have security trimming information about the patient's access rights to a content on the appointment schedule, resulting in "Indeterminate" value for the security trimming information. In such a case, a requesting operation 402 requests a security trimming provider about the security trimming information associated with that content. The results of the request are evaluated by an evaluation operation 404.

If the security trimming provider returns the value of the security trimming to be "Failure," an operation 406 sets the value of the security trimming information in the access cache to "Failure" and sets the TTL associated with the security trimming information to be "Short." In such a case, the access cache assumes that the problem that caused the result to be "Failure" will be corrected in a short period of time, and therefore, another request sent to the security trimming provider in a short period of time will result in receiving the value of the security trimming information. However, if the security trimming provider returns the value of the security trimming information to be "Access," an operation 408 sets the value of the security trimming information in the access cache to "Access" and sets the TTL associated with the security trimming information to be "Long." In this case, because the patient has access to the content, a displaying operation 410 displays the content to the patient.

However, if the security trimming provider returns the value of the security trimming information to be "Indeterminate," an evaluation operation 412 evaluates the number of attempts or requests made by the access cache to obtain the value of the security trimming information from the security trimming provider. If the number of such attempts is above a threshold, indicating that even after a large number of attempts, the value of the security trimming information cannot be obtained, an operation 414 infers that the user does not have access to the content, and therefore, sets the value of the security trimming information in the access cache to "No Access" and sets the TTL associated with the security trimming information to be "Long." In this case, because the patient has no access to the content, a displaying operation 416 displays the appointment calendar without the content for which the patient has no access.

On the other hand, if the number of attempts or requests made by the access cache to obtain the value of the security trimming from the security trimming provider is below the threshold, an operation 418 sets the value of the security trimming information in the access cache to "Indeterminate" and sets the TTL associated with the security trimming to be "Medium." In such a case, the operation 418 also increases the count that indicates the number of attempts or requests made by the access cache to obtain the value of the security trimming information from the security trimming provider.

Figure 5:
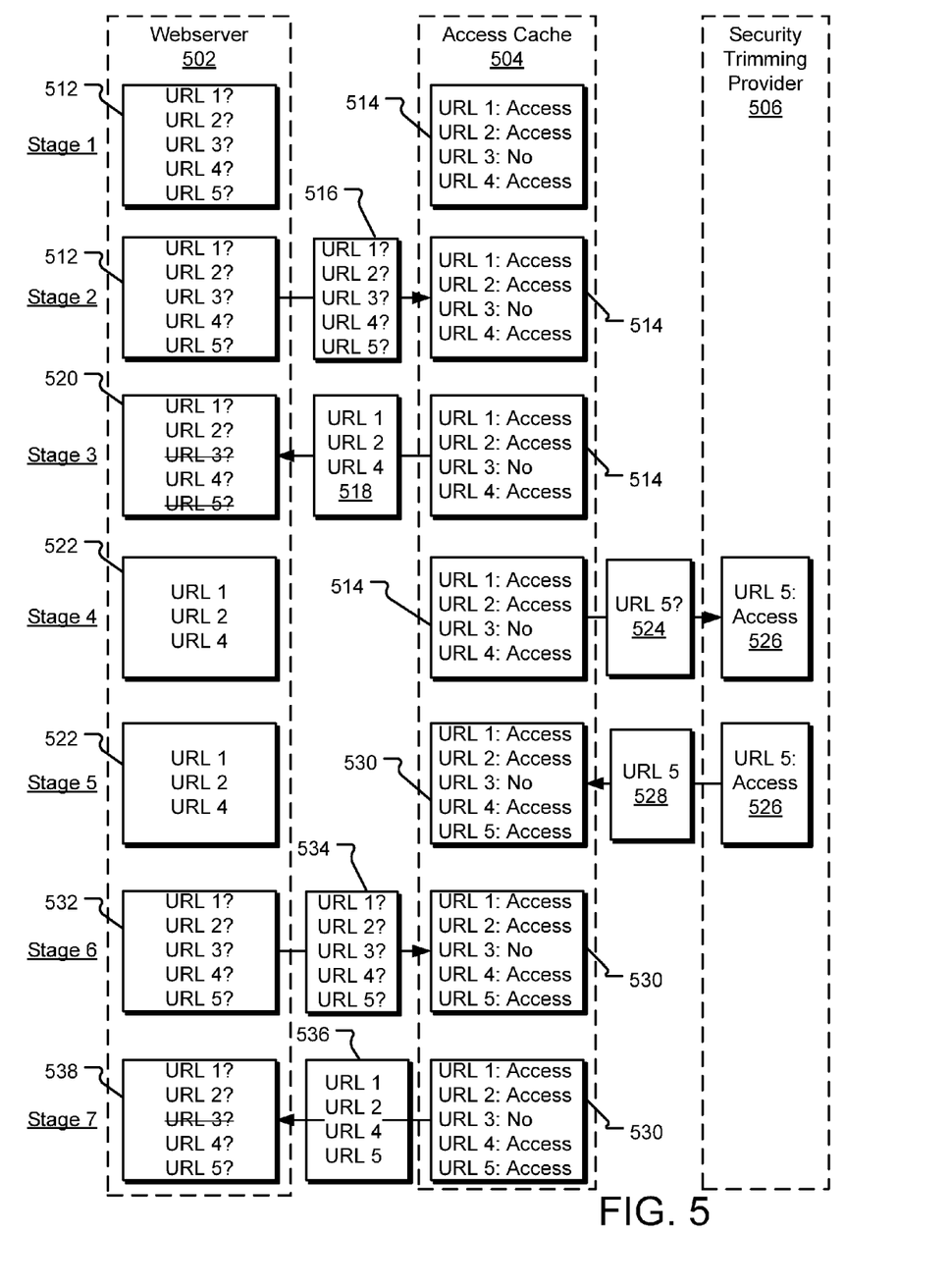
FIG. 5 illustrates example use of the security trimming system disclosed herein.

FIG. 5 illustrates example use of the security trimming system disclosed herein. Specifically, FIG. 5 illustrates various stages for a webserver 502, an access cache 504, and a security trimming provider 506 during use of a security trimming system disclosed herein. At stage 1, a user, such as a patient of a healthcare provider, navigates to a particular document, such as a web page displaying a patient appointment schedule from the webserver 502. In the illustrated example, such document includes five potential universal resource locators (URLs), URL1-URL5 that can be displayed to the patient as part of the appointment schedule. Alternatively, URL1-URL5 represent five different pieces of information requested by the user, such as a patient scheduling information, patient diagnosis, patient test results, etc. At stage 1, as illustrated at 512, the webserver 502 needs to determine which of the five URLs can be displayed to the patient. At this stage, as illustrated at 514, the access cache 504 has security trimming information for URL1-URL4. Specifically, the access cache 504 shows that the patient can access URL1, URL2, and URL4, however the patient does not have access to URL3. At this stage, the access cache 504 does not have any security trimming information for URL5.

At stage 2, a request 516 for the security trimming information for the URL1-URL5 is sent to the access cache 504. Subsequently, at stage 3, the access cache 504 returns the results 518 with the security trimming information for URL1, URL2, and URL4 to the webserver 502. As a result, at 520, the webserver 502 updates the security trimming information for the requested URLs. Subsequently, at stage 4 the webserver 502 displays URL1, URL2, and URL4 to the patient, as illustrated at 522. While the webserver 502 is displaying the content to the patient using the security trimming information provided by the access cache 504, in the background, the access cache 504 sends a request 524 to the security trimming provider 506 for the security trimming information for the URL5. As illustrated at 526, the security trimming provider 506 shows that the patient has access to the URL 5.

At stage 5, the security trimming provider 506 sends results 528 with the security trimming information for the URL5 to the access cache 504. The access cache 504 updates the security trimming information for URL5 based on the result from the security trimming provider 506. As a result, as shown at 530, the access cache 504 now shows that the patient has access to URL1, URL2, URL4, and URL5.

Subsequently, at stage 6, the user refreshes a web browser displaying the document, such as the appointment schedule. In response to the user refreshing the appointment schedule, the webserver 502 resets all security trimming information for the user. Thus, as illustrated at 532, the webserver 502 needs to determine the security trimming information for each of URL1-URL5. As a result, the webserver 502 sends a new request 534 for the security trimming information for the URL1-URL5 to the access cache 504.

At stage 7, the access cache 504 sends the updated security trimming information 536 to the webserver 502. Note that because the access cache 504 has security trimming information for each of the URL1-URL5, no request to the security trimming provider 506 is sent at this stage. This results in reduction of expensive requests sent to the security trimming provider 506. The webserver 502 updates its security trimming information so that, as illustrated at 538, the user is provided access to URL1, URL2, URL4, and URL5. In an alternative implementation, the access cache 504 is configured to send the updated security trimming information to the webserver 502 on a periodic basis even when no new request is received from the webserver 502 for the updated security trimming information.

Figure 6:
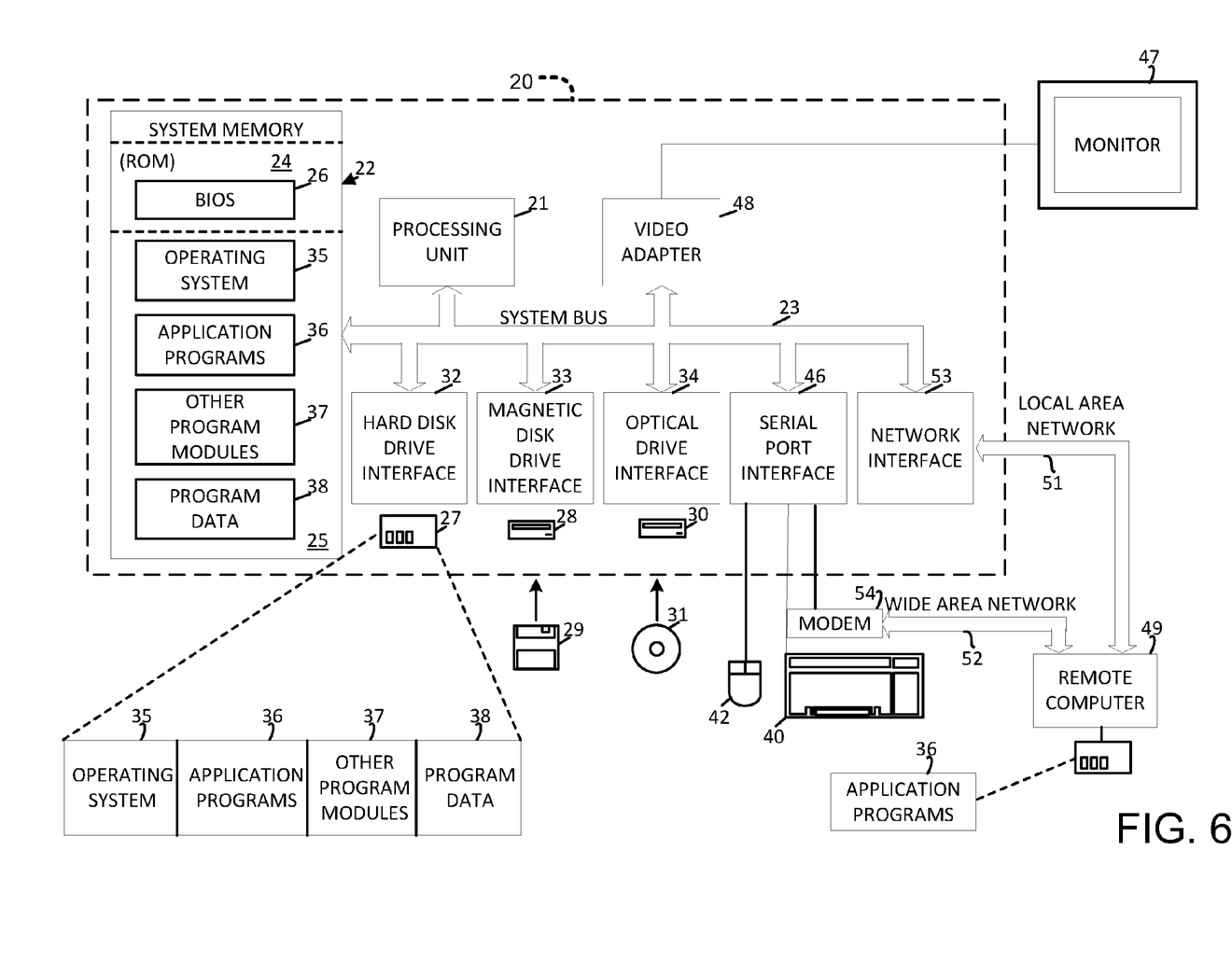
FIG. 6 illustrates an example system that may be useful in implementing the described technology.

FIG. 6 illustrates an example system that may be useful in implementing the described technology. The example hardware and operating environment of FIG. 6 for implementing the described technology includes a computing device, such as general purpose computing device in the form of a gaming console or computer 20, a mobile telephone, a personal data assistant (PDA), a set top box, or other type of computing device. In the implementation of FIG. 6, for example, the computer 20 includes a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 6. The logical connections depicted in FIG. 6 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are example and other means of and communications devices for establishing a communications link between the computers may be used.

In an example implementation, various components of a security trimming system may be embodied by instructions stored in memory 22 and/or storage devices 29 or 31 and processed by the processing unit 21. The content security information, the security trimming datastore, and other data may be stored in memory 22 and/or storage devices 29 or 31 as persistent datastores. Further, a security trimming system represents hardware and/or software configured to provide service functionality for network-connected systems. Such services may be implemented using a general purpose computer and specialized software (such as a server executing service software), a special purpose computing system and specialized software (such as a mobile device or network appliance executing service software), or other computing configurations. In an alternative implementation, the security trimming system and various modules thereof may also be stored on mobile datastores, clouds, etc.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method comprising:
   receiving, at a server, a first request from a user for access to content on the server;
   retrieving, from a security datastore, a value of an access privilege of the user to access the requested content in response to the received first request;
   storing, in a cache on the server, the retrieved value of an access privilege of the user to access the requested content and one or more parameters associated with a time of receiving the value of the access privilege of the user to access the content, one of the parameters being a time to live (TTL) for the value of the access privilege to the content;
   adjusting a length of time of the TTL based on a number of times that the received value of the access privilege of the user to access the content is affirmative in a predetermined prior period of time;
   receiving, at the server, a second request from the user for access to the content on the server;
   in response to receiving the second request, evaluating, at the server, the length of time of the TTL for the value of the access privilege of the user to access the content to determine validity of the stored value of the access privilege of the user to access the content; and
   upon determining that the stored value of the access privilege of the user to access the content is valid, allowing the user to access the content on the server.

2. The method of claim 1 further comprising:
   sending a request to a security datastore for an updated value of the access privilege to the content upon determining the stored value of the access privilege to the content to be invalid;
   receiving the updated value of the access privilege to the content; and
   communicating the updated value of the access privilege to the content in response to the request.

3. The method of claim 2 further comprising:
   updating the stored value of the access privilege to the content with the updated value of the access privilege to the content; and
   updating the one or more parameters associated with the time of receiving the value of the access privilege to the content.

4. The method of claim 2, wherein sending a request to the security datastore further comprises sending a request to multiple security datastores.

5. The method of claim 1, wherein the one or more parameters comprising a time at which the value of the access privilege to the content is last received.

6. The method of claim 1, wherein evaluating the one or more parameters further comprising evaluating a number of prior requests to the security datastore for the value of the access privilege to access the content that generated results similar to the stored value of the access privilege to the content.

7. One or more computer-readable storage devices encoding computer-executable instructions that when executed by a computing processor on a computer system, cause the computing processor to perform a computer process, the computer process comprising:
   receiving a first request from a user for access to content on the computer system;
   retrieving from a security datastore, a value of an access privilege of the user to access the requested content in response to the received first request;
   storing, in a cache, the retrieved value of the access privilege of the user to access the requested content and one or more parameters associated with the value of the access privilege of the user to access the content, one of the parameters being a time to live (TTL) for the value of the access privilege to the content;
   adjusting a length of time of the TTL based on a number of times that the received value of the access privilege of the user to access the content is affirmative in a predetermined prior period of time;
   subsequently, receiving a second request from the user for access to the content on the server; and
   in response to receiving the second request, performing an evaluation of the length of time of the TTL stored in the cache and associated with the value of the access privilege of the user to access the content; and
   determining validity of the stored value of the access privilege of the user to access the content based on the performed evaluation.

8. The one or more computer-readable devices of claim 7, wherein the one or more parameters associated with the value of the access privilege to the content comprise one or more parameters associated with a time of receiving the value of the access privilege to the content.

9. The one or more computer-readable devices of claim 8, wherein the one or more parameters comprise a time at which the value of the access privilege to the content is last received.

10. The one or more computer-readable devices of claim 7, wherein the computer process further comprises:

in response to determining that the stored value of the access privilege of the user to access the content is valid based on the performed evaluation, allowing the user to access the content on the computer system in connection with the second request.

11. The one or more computer-readable devices of claim 10, wherein the computer process further comprises:
sending a request to the security datastore for an updated value of the access privilege to the content upon determining the stored value of the access privilege to the content to be invalid; and
receiving and storing in the cache the updated value of the access privilege of the user to access the content.

12. The one or more computer-readable devices of claim 11 wherein sending a request to the security datastore further comprises:
sending a request to a primary datastore;
evaluating a response from the primary datastore; and
sending a request to a secondary datastore if the response from the primary datastore indicates an indeterminate value of the access privilege to access the content.

13. The one or more computer-readable devices of claim 11, wherein the computer process further comprises:
updating the stored value of the access privilege to the content with the updated value of the access privilege to the content; and
updating the one or more parameters associated with the time of receiving the value of the access privilege to the content.

14. The one or more computer-readable devices of claim 11, wherein the process further comprises:
adjusting a value of a counter indicating a time to send a request to the security datastore for the updated value of the access privilege to the content when the updated value of the access privilege to the content indicates a failure to receive the updated value of the access privilege to the content from the security datastore.

15. The one or more computer-readable devices of claim 11, wherein the process further comprises:
upon determining that the updated value of the access privilege to the content indicates at least one of a failure and an indeterminate value,
updating a number of requests counter indicating the number of requests sent to the security datastore; and
updating a time to next request counter indicating the time before a next request is sent to the security datastore.

16. The one or more computer-readable devices of claim 7, wherein performing the evaluation of the one or more parameters further comprises evaluating a number of prior requests to a security datastore for the value of the access privilege to the content that generated results similar to the stored value of the access privilege to the content.

17. A computing system, comprising:
a computing processor and
a memory containing instructions that when executed by the computing processor, cause the computing processor to perform a process comprising:
receiving, at the computing system, a first request from a user for access to certain content;
retrieving, from a security datastore, a value of an access privilege of the user to access the requested content in response to the received first request;
storing, in a cache on the computing system, the retrieved value of the access privilege of the user to access the requested content and one or more parameters associated with a time of receiving the value of the access privilege of the user to access the content, one of the parameters being a time to live (TTL) for the value of the access privilege to the content;
adjusting a length of time of the TTL based on a history of one or more previous requests to the security datastore and corresponding retrieved values of the access privilege;
receiving, at the server, a second request from the user to access the content;
in response to receiving the second request, determining validity of the value of the access privilege of the user that is stored in the cache based on the length of time of the TTL associated with the value of the access privilege of the user to access the content; and
in response to determining that the stored value of the access privilege of the user to access the content is valid, allowing the user to access the content.

18. The computing system of claim 17, wherein the one or more parameters associated with the value of the access privilege to the content comprise one or more parameters associated with the time of receiving the value of the access privilege to the requested content.

19. The computing system of claim 17, wherein the one or more parameters comprise a time at which the value of the access privilege to the requested content is last received.

20. The computing system of claim 17, wherein the process performed by the computing processor further comprising updating a time to a request counter indicating the time before a next request is sent to the security datastore, in response to that a received value of the access privilege to the requested content indicates at least one of a failure or indeterminate value.

* * * * *